C. LINDER.
COMBINED PLANTER AND FERTILIZER DISTRIBUTER.
APPLICATION FILED APR. 4, 1910.
976,383.
Patented Nov. 22, 1910.
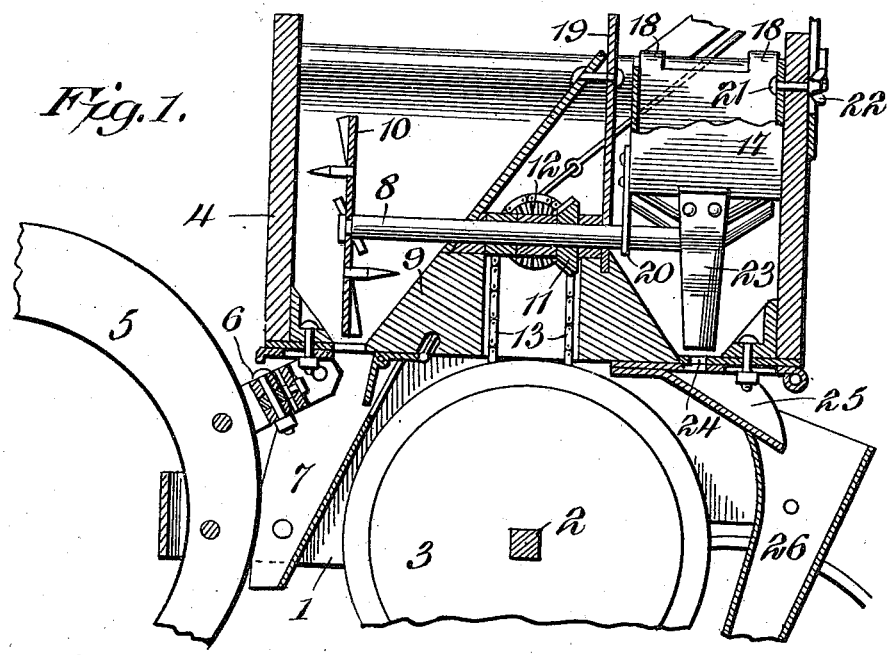
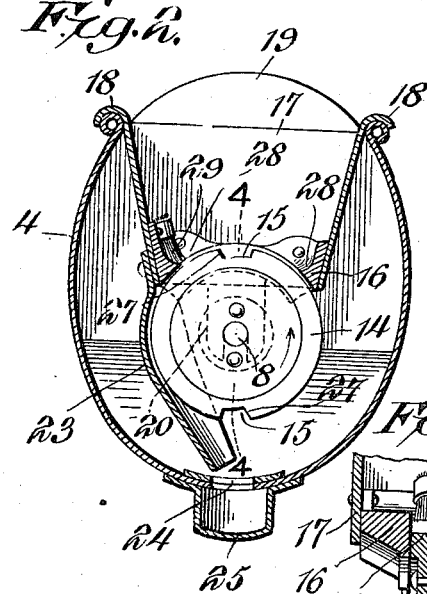
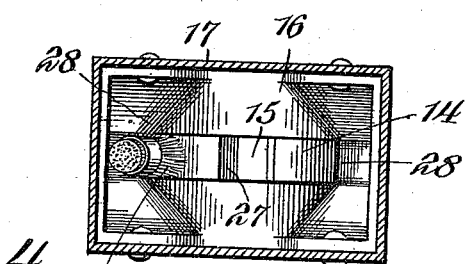
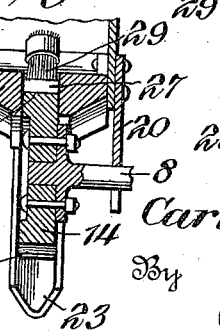
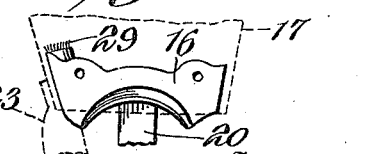

UNITED STATES PATENT OFFICE.

CARWIN LINDER, OF CONVERSE, SOUTH CAROLINA.

COMBINED PLANTER AND FERTILIZER-DISTRIBUTER.

976,383.

Specification of Letters Patent. Patented Nov. 22, 1910.

Application filed April 4, 1910. Serial No. 553,237.

*To all whom it may concern:*

Be it known that I, CARWIN LINDER, a citizen of the United States, residing at Converse, in the county of Spartanburg and State of South Carolina, have invented a new and useful Combined Planter and Fertilizer-Distributer, of which the following is a specification.

This invention relates to combined planters and fertilizer distributers and has special reference to the planter disclosed in Letters Patent No. 922,922, granted to me May 25, 1909.

The object of the present invention is to provide a seed-dropping mechanism which will operate with very little friction, will be of simple construction, and will operate positively to feed the seed to the seed-dropping tube.

A further object of the invention is to provide a seed-dropping mechanism embodying a supplemental or removable hopper which may be easily fitted within or taken from the main body or hopper of the planter when it is desired to clean or repair the operating parts.

These objects, and such other incidental objects as will hereinafter appear, are attained in the use of the mechanism illustrated in the accompanying drawings, and the invention consists of certain novel features of the same which will be hereinafter first fully described and then pointed out in the appended claims.

In the accompanying drawings, Figure 1 is a central vertical longitudinal section of my combined fertilizer distributer and planter showing my present invention embodied therein. Fig. 2 is a transverse vertical section in a plane parallel with and immediately adjacent to the side of the seed-dropping wheel. Fig. 3 is a plan view of the seed-dropping wheel and parts contiguous thereto, the hopper being shown in section. Fig. 4 is a sectional view taken on the line 4—4 of Fig. 2. Fig. 5 is a detail side elevation.

In the drawings, 1 designates a portion of the main frame, in which is journaled an axle 2 having a carrying wheel 3 secured thereon. 4 designates the main body or hopper of the planter, and 5, the plow beam connected to the hopper by a swivel connection 6 in advance of a discharge spout 7 which is secured to the hopper and the side frames and depends from the hopper in advance of the carrying wheel. 8 designates an operating shaft which is journaled in a suitable support 9 within the hopper and extends longitudinally of the same, having a stirring wheel 10 on its front end and provided at an intermediate point of its length with a bevel pinion 11 meshing with a similar pinion 12 which carries a sprocket wheel engaged and driven by a sprocket chain 13 actuated by a corresponding sprocket wheel on the axle 2. The several parts, thus far enumerated, are fully described and shown in my aforesaid Letters Patent and form no part of my present invention. They are shown, however, in the present application, in order that the particular improvements forming the subject-matter of this application may be thoroughly comprehended.

On the rear end of the driving shaft 8, I secure a dropping wheel 14 which is provided in its edge with one or more notches or seed-receiving cavities 15, as shown clearly in Fig. 2, and this wheel plays within the slotted bottom 16 of a hopper 17 which is provided at its sides with outwardly-projecting lips or flanges 18 adapted to rest upon the side edges of the main body or hopper 4, as shown in Fig. 2, whereby the supplemental hopper 17 will be removably supported within the main hopper. This supplemental hopper 17 is arranged between the rear end of the main hopper or body and the transverse partition 19 therein and is provided at its front side with a depending forked bracket 20 adapted to rest upon the driving shaft 8, as clearly shown in Figs. 1 and 4. The rear wall or side of this supplemental hopper is secured to the rear end of the main hopper by a thumb bolt 21 inserted through the rear walls of the two hoppers and provided with a thumb nut 22, as shown clearly in Fig. 1, whereby the supplemental hopper may be rigidly clamped to the main hopper so as to fit within the rear compartment thereof, and at the same time may be easily removed therefrom. When it is desired to remove the supplemental hopper, it is necessary simply to loosen the thumb-nut 22 so that the bolt 21 may be removed, after which the supplemental hopper may be lifted bodily from the main hopper, as will be readily understood on reference to Fig. 2.

The seed-dropping wheel or disk 14 rotates from right to left, as indicated by the arrow in Fig. 2, and on the left hand side of the supplemental hopper, I secure a guide trough or spout 23 which fits closely around the seed-dropping wheel and depends therefrom so as to terminate immediately over the outlet 24 and thereby guide the seed deposited by the seed-dropping wheel through the said outlet into the chute 25 by which the seed will be directed into the planting tube 26, as will be readily understood.

The notches or pockets 15 in the periphery of the seed-dropping wheel have their end walls converging toward the center of the disk, and the front wall 27, or that wall which will appear at the left hand side when the notch is uppermost, is deeper than the opposite wall, so that as the wheel rotates, the seed which drops into the pocket will be supported until the seed has almost completed one-half of a revolution and will be thereby prevented from scattering and will be directed positively to the discharge or outlet opening. The spout 23 fits closely against the periphery of the seed-dropping wheel so that the seed will be held within the pocket 15 and supported by the wall 27 of the same and also by the spout, as will be readily understood from Fig. 2 of the drawings.

The bottom plate of the supplemental hopper is in the form of a casting having its ends depending somewhat below its center so that the sides of the bottom will follow the periphery of the seed-dropping wheel and consequently aid in preventing the loss of seed by bringing the side walls of the bottom plate close against the sides and periphery of the wheel, as shown and as will be readily understood. This construction of the bottom plate also provides recesses 28 at the ends of the said plate upon the upper side of the same so that the seed will be caused to collect below the highest point of the wheel 14 and at the side of the same and will be thereby more readily engaged and taken up by the pockets or notches 15 in the said wheel.

In order to prevent an excessive quantity of the seed passing into the spout 23 with the wheel, a brush 29 is secured upon the bottom plate at the left side of the same and extends into the central longitudinal slot of the said plate so as to sweep over the edge of the dropping wheel as the same rotates.

The operation of the invention will be readily understood. As the planter is drawn over the ground, motion is imparted to the carrying wheel 3 and transmitted from the same to the shaft 8 so that the stirrer wheel 10 and the dropping wheel 14 will be rotated so as to agitate the fertilizer and deposit the same in the discharge spout or tube 7 and also to take up a quantity of seed and pass the same through the chute 25 and tube 26 to the furrow provided for the seed. As the seed-dropping wheel rotates, the notches 15 in the periphery of the same are successively brought to the top of the wheel so as to pass from one side to the other of the hopper and in such passage receive grain dropping by gravity to the bottom of the supplemental hopper. The seed which is received in the pocket will be carried under the brush 29 and then on around through the spout 23 and will be directed by the said spout through the openings 24 as the notch is carried away from the spout in the continued rotation of the wheel.

It will be readily noted that the dropping wheel plays in a longitudinal slot in the bottom plate of the supplemental hopper and fits closely against the side walls of the said slot so that the seed will be constantly passing to the wheel through its own weight and will be prevented from escaping past the sides of the wheel. The shape of the sides and ends of the bottom plate is such as to hold a slight accumulation of the seeds at the side of the wheel which may be easily engaged by the pocket so that clogging of the seed over the wheel will be avoided. In my present arrangement, the seed-dropping wheel is not forced to move through a large body of seed and is not forced to move past a plurality of brushes or other devices which will bear upon the wheel so as to have frictional engagement therewith and thereby retard the operation of the device. The bracket 20 rests loosely on the driving shaft so that it will offer no interference with the removal of the supplemental hopper, and consequently when it is necessary to clean or repair the dropping wheel or the discharge-controlling valve or other parts, the hopper can be instantly lifted from its position within the main body or hopper and all the parts thereby made accessible. The provision of this supplemental hopper enables me to hold the entire body of seed above the dropping wheel out of contact with the sides of the same so that the said wheel revolves freely in an open space and, consequently, the operation of the machine is made very easy.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what

I claim as new, and desire to secure by Letters Patent, is:—

1. The combination of a main body or hopper, a driving shaft mounted longitudinally therein, means for rotating said shaft, a dropping wheel on the rear end of said shaft at a right angle thereto, and a supplemental hopper removably suspended on the sides of the main hopper and arranged transversely therein and having its bottom plate fitting over and against the sides of the dropping wheel above the driving shaft.

2. The combination with a main hopper, of a driving shaft longitudinally disposed therein, means for rotating said shaft, a dropping wheel on the rear end of said shaft, a supplemental hopper having its rear wall removably secured to the rear wall of the main hopper, and a bracket depending from the front side of the supplemental hopper and fitting over the driving shaft.

3. The combination of a main hopper, a transverse dropping wheel therein, means for rotating the said wheel in a plane transverse to the hopper, and a supplemental hopper provided at its upper end with outstanding flanges adapted to rest upon the side edges of the main hopper and having a slotted bottom plate fitting over and closely against the dropping wheel.

4. The combination with a main hopper having a discharge opening in its bottom, and a transverse dropping wheel therein, of a supplemental hopper removably suspended upon the walls of the main hopper and having a slotted bottom plate fitting over and closely against the dropping wheel, and a spout secured to said bottom plate and depending therefrom in proximity to the dropping wheel and terminating over the discharge opening in the bottom of the main hopper.

5. The combination of a main hopper, a transverse dropping wheel therein having notches in its edge, means for rotating the said wheel, and a supplemental hopper suspended upon the side walls of the main hopper and having a bottom plate fitting closely over and against the dropping wheel and provided in its upper side at its ends with pockets leading to the dropping wheel, the central portion of said plate being elevated above the pockets.

6. The combination of a main hopper having a discharge opening in its bottom, a longitudinal driving shaft therein, means for rotating said shaft, a dropping wheel secured on the rear end of said driving shaft and disposed transversely of the hopper over the discharge opening in the bottom of the same, said dropping wheel having pockets in its edge, a supplemental hopper suspended upon the side walls of the main hopper and arranged transversely therein, the rear wall of said supplemental hopper being secured to the rear end of the main hopper, a bracket secured to and depending from the front side of said supplemental hopper and fitting over the driving shaft, a solid bottom plate secured within the supplemental hopper and fitting over and closely against the dropping wheel, and a discharge spout secured to one side of the supplemental hopper and depending therefrom to the discharge opening in the bottom of the main hopper, said discharge spout partly inclosing the dropping wheel.

In testimony, that I claim the foregoing as my own, I have hereto affixed my signature in the presence of two witnesses.

CARWIN LINDER.

Witnesses:
E. F. VANDIVER,
E. E. WEBBER.